J. G. CLARK.
COMPUTING DEVICE.
APPLICATION FILED NOV. 4, 1919. RENEWED MAY 2, 1922.
1,423,493.
Patented July 18, 1922.
2 SHEETS—SHEET 2.
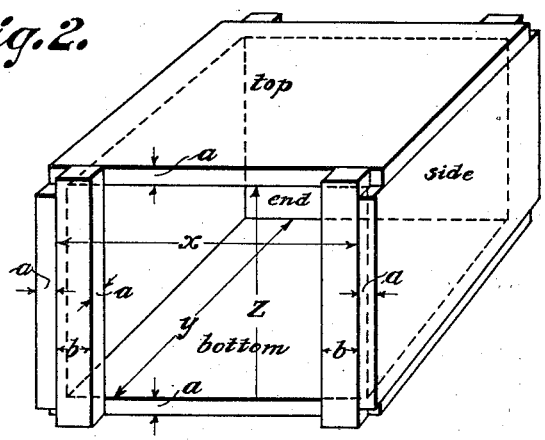
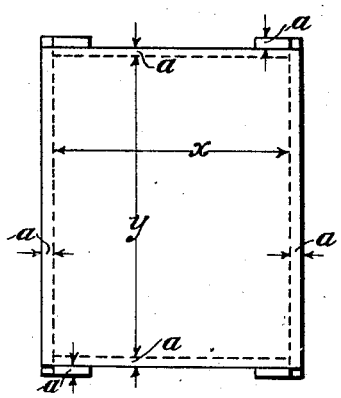
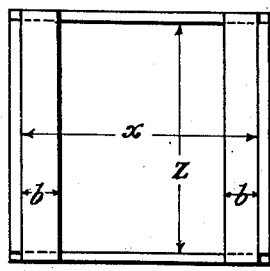
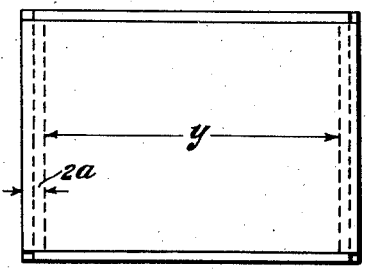
INVENTOR,
John G. Clark,
BY Harry W. Bowen
ATTORNEYS.

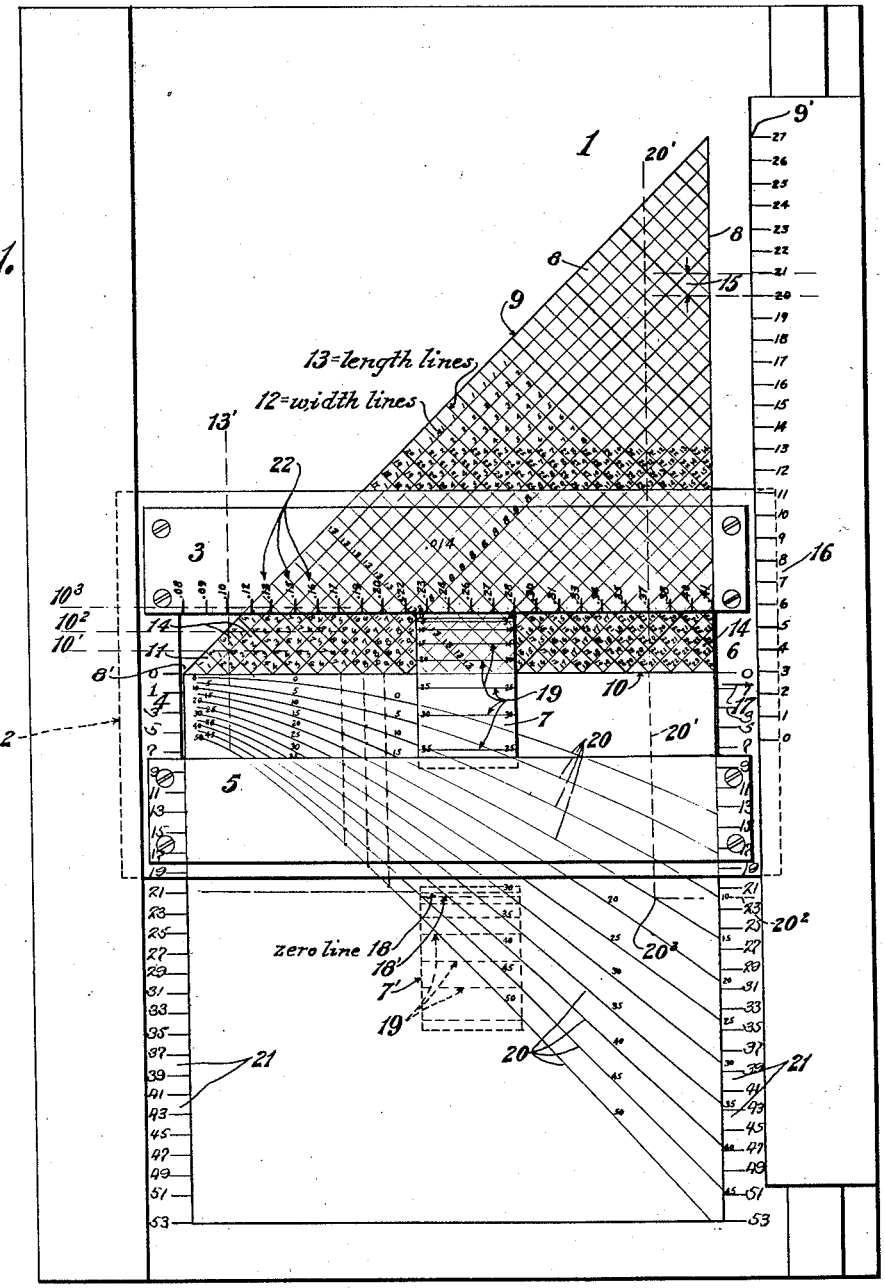

UNITED STATES PATENT OFFICE.

JOHN G. CLARK, OF HOLYOKE, MASSACHUSETTS.

COMPUTING DEVICE.

1,423,493.    Specification of Letters Patent.    Patented July 18, 1922.

Application filed November 4, 1919, Serial No. 335,615. Renewed May 2, 1922. Serial No. 558,039.

*To all whom it may concern:*

Be it known that I, JOHN G. CLARK, a citizen of the United States of America, residing at Holyoke, in the county of Hampden and Commonwealth of Massachusetts, have invented certain new and useful Improvements in Computing Devices, of which the following is a specification.

This invention relates to improvements in charts, devices or instruments for the purpose of rapidly and accurately computing the number of square feet of lumber necessary to construct shipping cases, boxes or the like, of different inside dimensions when lumber of definite thickness is used. It comprises, in general, a base-piece, and two slides movably mounted thereon, one of the slides being designed to be moved lengthwise of the base-piece and the other slide, being smaller and movable transversely, is carried by the movable slide, and designed for the purpose of making the initial and final readings on the chart, to determine the number of square feet of lumber necessary to construct a shipping box, or case, of different internal dimensions. The base-piece of the chart, over which the two slides move, is provided with two sets or series of numerals, one of the sets or series of numerals being placed at the side of a triangular shaped member that is divided into a large number of small squares that are formed by intersecting lines which represent the inside width and length of a box, and the other set of numerals being located on curves designed to represent the inside depth of the shipping box when lumber of a definite thickness is used.

An object of the invention is, therefore, by means of the movable slides and the sets of numerals on the chart, to quickly and accurately compute the number of square feet of lumber required to construct the box or shipping case, it being understood that the chart represents a definite predetermined thickness of lumber that is to be used, as for example three quarters of an inch, and predetermined widths of cleats, usually located at the ends of the box.

It is a well known fact, in the construction of shipping boxes for transporting goods of various kinds, as for example paper or machinery, that the number of square feet of lumber that is required does not vary proportionately with the cubical contents of a box or case and therefore it has been found difficult to rapidly and accurately estimate the cost of a shipping case, particularly where the cases are not all made or constructed in the same manner, as, oftentimes a case will have only four cleats attached thereto, two at each end, and, then again, there will be eight cleats used, or four at each end.

Referring to the drawings forming a part of the specification, in which:

Fig. 1 is a plan view of the device showing the two sets of numerals, the two slides and the depth curves.

Fig. 2 is a detail view in perspective, of a box showing the notation used in arriving at the general algebraic formula or expression which is used to compute the area and the depth curves shown in Fig. 1, and Figs. 3, 4 and 5 are views showing the top, end and side views of a shipping case or box having two cleats at each of its ends.

Referring to the drawings in detail: The base portion of the chart is indicated at 1. 2 indicates a large slide movable lengthwise thereover, which is formed or made up of the pieces indicated at 3, 4, 5, and 6 that are formed by intersecting lines which represent secured together in any suitable manner. Mounted on the slide 2 is a smaller slide 7, which is adapted to be moved lengthwise of the slide 2 and transversely of the base-piece 1, between the end members 4 and 6, and under the members 3 and 5. The slide 7 can therefore be placed in any position with reference to the base-piece. This slide is provided with lines as shown for correction purposes in computing the number of square feet of lumber required for boxes of different widths and lengths as will be fully described. Located on the base-piece 1 is a piece 8, which may be of thin material, as paper, that is formed in the shape of a right-angled triangle, the hypothenuse or inclined side 9 being 45° to the horizontal. This triangular shaped piece is ruled or divided into a large number of small geometrically shaped squares by means of intersecting lines that are drawn parallel to the side 9 and at right angles thereto, as shown. These lines may be considered coordinates. The base or lower line, or edge 10, of the triangular piece is to be considered the zero line from which all of the horizontal rows of squares formed by the intersecting lines with this line 10 are numbered and with reference to which line the depth curves are plotted. Also the correction lines on the small slide are located with reference to this zero or base line. The squares representing the first or horizontal row above the base or zero line 10, indicated at 11, have placed therein and on the sides thereof, the numerals 1—1, 2—2, 3—3, 4—4, etc., which represent boxes whose inside length and width are equal. The width and length lines intersect, it will be noticed, with this base line. The lines 12 that are parallel with the inclined edge 9 represent the inside width dimensions of the packing case or box, and those that are at right angles thereto, indicated at 13, represent the inside length of the box. The intersecting points of all of these lines which are vertically above their intersecting points with the zero line 10 are the points which are employed in using the instrument by placing the zero line at the top of the small slide 7 so as to coincide with these intersecting points when the square feet of lumber is to be computed in constructing a box of a certain length and width, as will be fully explained in describing the operation of the instrument.

The second horizontal row of squares, indicated by the reference numeral 14 and vertically above the first row 11 as indicated by the vertical line 13′, represents the inside dimensions of a box or case in which the length is increased by one and the numerals on the width lines are decreased by one, as shown by the series of figures on the sides of the squares immediately above and in the vertical line 13′ which passes through the points of intersection of the lines 12 and 13. In other words, the intersecting lines have numbers thereon which read consecutively starting from the left hand lower angle 8′ as shown. The horizontal line 10 may be considered the first row or line of intersecting points of the lines 12 and 13. The lines $10'$, $10^2$, $10^3$, $10^4$ etc., may be considered the second, third, fourth and fifth lines, etc., of the other rows of intersection points of the lines 12 and 13.

The purpose of placing the numerals on the sides of each of the horizontal rows of squares that are vertically above each other, as indicated by the line 13′ is for the purpose of taking care of boxes or cases in which the inside width and length dimensions vary when computing the number of square feet of lumber necessary to construct boxes of different dimensions. The purpose of arranging the line 9 at an angle of 45° to the base or horizontal line 10 of the triangle is so that the points of the intersecting lines which represent the inside width and length may be vertically above one another, as shown, and so that the sum of these dimensions in any vertical line may be equal, as for example, 5+5, 6+4, 7+3, etc.

Arranged along the right hand side of the chart are a series of numerals from zero to the point 9′ and indicated at 16. The distance apart of the spaces from one numeral to the next is equal to the vertical and diagonal distance of the intersecting points of the width and length lines 12 and 13 and indicated at 15. The position of the zero mark of the series of numerals 16 corresponds with the arrow 17 on the large movable slide 2 when the zero line 18 on the small slide 7 coincides with the zero line 10 of the triangle. The arrow 17 will, of course, point to a different numeral as the slide 2 is moved upward. As shown it is pointing to 2.5.

The slide 7 is formed with a series of parallel lines 19 which are termed "correction lines" for cases of different inside widths, and lengths. The manner, or how these lines are located or spaced on this slide 7 will, as stated above, be described later in the specification in connection with the equations upon which the theory of the chart or computing device is based.

The curves on the lower part of the base-piece of the chart, indicated as a whole by the numeral 20, represent different inside depths of a shipping box or case and always having different width and length dimensions. The numerals placed thereon, from zero to 50, represent the inside depths of the box in inches. The series of numerals at the right and left hand side of the chart indicated at 21 represent the number or final result in square or surface feet of lumber which it is necessary to use in constructing boxes of different dimensions. They are plotted or located after solving equations for cases of different dimensions with reference to the squares or rectangular figures above as shown, from 1 to 53, or any convenient number, are placed thereon and represent or equal the square feet of lumber necessary to construct the box or case, or in other words, each unit equals one square foot of lumber measure. These figures are used in the final reading of the instrument, and, as stated, represent square feet.

It is to be understood that the series of numerals at the right of the chart and indicated at 21 are merely illustrative of the final result in square feet, and are not understood to accurately indicate the final result in square feet, since the accompanying drawings are greatly reduced in scale from the instrument as actually constructed and used.

Referring now to the manner in which the theory of the instrument is developed, how the depth curves are plotted, and the spacing of the correction lines 19 on the small slide 7: Referring first to Figs. 2, 3, 4, and 5, which is a common style of shipping box or case whose surface measure in square feet is to be computed or determined, let $-x-$ equal the inside width of the box or case, $-y-$ its inside length, and $-z-$ its inside depth. These dimensions are understood to be in inches. $-a-$ equals thickness of the lumber used, and $-b-$ the width of the cleats of the box. The equations or algebraic expressions representing the different parts of the box or crate would be:

Top and bottom _____ $(2)(y+2a)(x+2a)$
Sides _____ $(2)(y+4a)(z)$
Ends _____ $(2)(xz)$
Cleats _____ $(4)(b)(z+2a)$ This is the general algebraic formula for the surface measure, when the same are developed and added together, is as follows:

$$2xy+4ay+4ax+8a^2+2zy+8az+2xz+4bz+8ab$$

This is the general algebric formula for the outside surface measure of the lumber necessary to construct the style of box or case shown in Figs. 2 and 3.

It will be seen from this expression that the members of the equation completely cover not only the outside area of the box or case in square inches, but the four cleats to be applied to the case, two at each end. Should there be eight cleats, then the above expression would be changed accordingly.

In order to plot the depth curves 20 from the general equation or expression for the outside surface or area, it is only necessary to substitute values for the length and breadth (or $x$ and $y$) which are equal to each other, as shown by the intersection of the width and length lines with the zero line 10 which line is the intersecting points for all of the first row of squares 11. In other words, eliminating $x$ and $y$ values and reducing the equation to a $z$ or depth equation. By substituting different depth or $z$ values in the above equation and equal values for $x$ and $y$ as for example: $x=21$, $y=21$, and $z=15$ will give a point on the 15 inch depth curve. It should be stated that substitution of these values in the expression for the type of case decided upon, will give the number of square inches of surface measure. In order to obtain the number of square feet division by 144 is necessary. Now find the number representing square feet on the scale 21, which, as stated, represents square feet. Next project from this number along the line $20^2$ to a point $20^3$ in the line $20'$ which is vertically below that formed by the intersection of the width and length lines where the length and breath are each equal and as shown on the square under consideration in which the length and breath are each equal to 21. This resultant point, as shown by the intersection of the dotted lines $20'$, $20^2$ and $20^3$ is a point in the depth curve for a case whose depth is 15 inches. The 15 inch depth curve may, therefore, be plotted for all of the squares of equal width and length in the first row, indicated at 11. All of the other depth curves for any other depth of box may therefore, be plotted from the squares that are formed by the intersection of the length and breadth lines with the zero line 10, or the first row 11 by substituting figures for different depths as for example, 5, 6, 7, etc., up to cases 50 inches deep, as shown by the lowermost depth curve.

It is understood that the above expressions are for a predetermined or definite thickness of lumber, as three quarters of an inch. A correction must, therefore, be made when lumber of a different thickness is used. The general expression when lumber of three quarters of an inch thickness and cleats three inches wide is used, in square feet of surface would be represented by the following equation, or algebric expression: $3x+3y+18z+2xy+2zx+2yz+22\frac{1}{2}$ divided by 144. This equation is, of course, obtained when $a=$ three quarters of an inch and the cleats three inches wide, which values substituted in the general equation will reduce to this equation.

The figures shown at 22 must be added to the number of square feet shown at 21, plus the decimal expression .014 multiplied by the depth in inches, which is the correcting or multiplying factor for lumber over or under three quarters of an inch in thickness for every one quarter inch. The row of figures at 22 corresponds to each of the vertical rows of squares as shown by the vartical lines $13'$ which pass through intersection points of the lines forming the squares.

As showing how the multiplying factor .014 is obtained, the general equation for both one inch and three quarters of an inch lumber is solved. The equation for three quarters inch lumber being subtracted from the equation for one inch lumber as follows:

Equation for one inch thickness equals $4x+4y+20z+2xy+2xz+32$.

Equation for three quarter inch thickness equals $3x+3y+18z+2xy+2xz+2yx+22\frac{1}{2}$.

By subtraction the correction for one quarter inch equals $x+y+2z+9\frac{1}{2}$. These correction values apply only for $\frac{3}{4}''$ to $1''$. For every point in the vertical line 13', $x+y+9\frac{1}{2}$ is of the same value, therefore this correction value may be found and divided by 144 to reduce the result to square feet, as for instance:

$$x=3$$
$$y=3$$

then $3+3+9\frac{1}{2} = 15\frac{1}{2}$ divided by $144 = \frac{15\frac{1}{2}}{144}$ or .11.

$$2z = \frac{2 \text{ times depth}}{144} \text{ or } \frac{2}{144} \text{ of depth.}$$

$\frac{2}{144} = .014$ nearly. Therefore the row of figures at 22 is obtained by solving $x+y+9\frac{1}{2}$ divided by 144 and .014 by solving $\frac{2}{144}$. To obtain correction, multiply .014 by depth in inches and add figures at 22 adjacent to intersection of width and length dimensions.

In order to obtain the necessary correction for the lumber required for constructing boxes of different lengths and breadths, but for the same depth, it is necessary to have the lines —19— on the small slide. It will be noticed from the dimensions shown on the squares of the triangular piece 8, that the width dimensions are $1''$ less and the length dimensions $1''$ greater for the row of squares indicated at 14, as compared with the dimensions in the row of squares —11— which are formed by the intersecting lines with the zero lines 10. Therefore substituting for —$x$— in the above expression, namely: $3x+3y+18z+2xy+2xz+2yz+22\frac{1}{2}$, $(x-1)$, and for $y$ $(y+1)$, the equation becomes $3x-3+3y+3+18z+2xy+2x-2y-2+2xz-2z+2yz+2z+22\frac{1}{2}$, and subtracting the first or above referred to equation, which is, $5x+y+18z+2xy+2xz+2yz+20\frac{1}{2}$, and from this we have as a result: $2x-2y-2$.

By substituting in this equation, $x-1$ for $x$ and $y+1$ for $y$ when $x=7$ and $y=7$, $x-1$ would equal 6, and $y+1$ would equal 8, giving the result $(-6)$. This, divided by 144, or .04, would be the distance of the line 18' on the small slide from the zero line 18, or a space or distance representing square feet of surface from the zero line to the first line 18' on the small slide 7. This line, and not the zero line 18 of the small slide must be used by placing the slide 7 so that the line 18' intersects with the proper depth curve which represents the depth of the box under consideration. In this way all of the correction lines 19 on the small slide may be located. These lines 19 are all located and their distance computed from the zero line 18 of the small slide for the reason that the correction for any size case is made with reference to the zero line 10 of the triangle.

This correction is necessary for the reason that it has been found in actual practice that the number of square feet of lumber required is not a constant with boxes of different lengths and widths although the total linear distance around boxes of different lengths and widths may be the same. As for example, a box 21 inches wide and 21 inches long equals 42 linear inches, and a box 30 inches long and 12 inches wide equals 42 linear inches, both being of the same depth, yet the number of square feet of lumber required to construct the box is not the same in both examples. The correction lines 19 on the small slide 7 are, therefore, necessary and are provided and located, as stated, to make the reading in square feet at the numerals 21 correct and these correction lines are, therefore, located as above described by substituting $x-n$ and $y+n$ for $x-y$, $n$ being any of the numerals in the first row of squares in the squares shown on the triangle.

As a further explanation for the use of the lines 19 on the small slide 7, it may be said that they are located as follows: By computing a box having its width and length dimensions equal, from any of the squares as shown by any point on the zero line 10 and any depth, the square feet of lumber is determined. Then performing the same computation for a box vertically above the squares on the zero line it will be found that the lumber required for such box above the zero line 10, as in the line 20', will be a less number of square feet of lumber than those designated by the squares 11 on the zero line and which are located directly beneath the point chosen. Therefore the lines 19 are necessary. The numerals 5, 10, 15, 20 and 35 on the slide 7 represent corrections for all of the horizontal rows of intersecting points of the lines 12 and 13.

It will be seen from this general algebraic equation for square feet of lumber that all of the members of the expression completely cover not only the outside area of the box or case, but the two cleats to be applied to each end of the case. Should there be eight cleats, then the above expression would be changed accordingly.

Referring now to the manner in which the chart is used in computing the lumber in square feet required to construct a box of definite dimensions, the zero line 18 on the small slide 7 is moved so that it coincides with the intersection of the two lines 12 and 13 which represent the width and the length of the inside dimensions of the box or case, the area or surface measure of which is to be computed. As shown in Fig. 1, the zero line of the small slide coincides with the intersection of width and length lines 8 and 13. Then the arrow 17 on the slide 2 points to a ertain number on the scale 16. As shown, this arrow is pointing to a position about 2.5. Next the operator picks out one of the lines (19) on the slide 7 that corresponds to the point indicated on the scale 16, namely 2.5, which is very near the zero line of the slide 7 as shown. The large slide is now moved downward and the line 2.5 on the slide 7 is moved, so as to intersect with one of the curves 20, representing the depth of the box or case to be built. As shown for example, in the dotted line position 7' of the slide 2, the line 2.5 on the small slide 7 is intersecting with the depth curve representing 45 inches. The small slide 7 is now moved towards the right or left hand against the column of figures 21 and the zero line 18 on the small slide indicates that about 21 square feet of lumber is required to construct a box having its inside dimensions 8 inches wide, 13 inches long and 45 inches deep and with two cleats at each end that are 3 inches wide.

What I claim is:

1. In a computing device of the kind described, the combination, a base-piece having thereon intersecting lines for forming rectangular shaped figures, curves on the base-piece and reference numerals thereon, a slide movable on the base-piece and over the figures, a movable piece carried by the slide and adapted to move transversely of the figures and having a zero line thereon which is designed to cooperate with the points of intersection of the said lines, said base-piece having numerals placed on the sides of the rectangular shaped figures and other numerals at the side of the curves, and with both of which the movable piece cooperates, said movable piece having correction lines which cooperate with the curves for determining the final result with reference to the numerals that are placed at the sides of the base-piece.

2. A device for the purpose described, comprising in combination, a base-piece, a slide movable thereon, a second slide on the movable slide, said base-piece having a member which is divided by lines into rectangular shaped figures, the intersecting points of the lines of the different rows of said figures being in vertical and horizontal alignment, curves on the base-piece which are plotted with relation to the vertical lines passing through the intersecting points of the lines of said figures, and the second slide having lines which cooperate with the curves and the member which is divided into said small figures, numerals on the base-piece and spaced from each other equal to the vertical distances between the intersecting points of the lines which form the rectangular shaped figures and with which the movable slide cooperates to determine the position of the second slide with reference to the curves, a scale adjacent the curves and to which reference is made from the zero line of the second slide to determine the final result when the proper line on the second slide cooperates with the desired curve.

3. A computing device of the kind described, comprising, a base-piece having rectangular shaped figures and spaced numerals thereon, a large and a small slide movable relative to the figures and numerals, the small slide having a zero and correction lines, the zero line serving to cooperate with the figures and numerals to determine the position of both of the slides, the base piece having curves with which the zero line and the correction lines of the small slide cooperate, said base piece having numerals thereon which are located adjacent the curves to indicate the final result when the lines on the small slide intersect or cooperate with the desired one of the curves, said first mentioned spaced numerals serving to indicate the diagonal distances of the rectangular shaped figures, for determining the position of the small slide when placed with relation to the curves.

4. A computing device comprising, in combination, a base-piece having intersecting lines to form rows of squares, said lines having reference numerals thereon and which are placed on the sides of the squares in such a manner that the numerals thereon increase or decrease in consecutive order, a series of spaced numerals on the base-piece and arranged with relation to the diagonal distances of the squares, two slides, one being designed to have its zero, or reading edge, for registration with the intersecting points of the lines of the squares and the other slide having a pointer movable over the spaced numerals to designate its position with reference to the rows of squares, curves on the base-member, said slide having correction lines in addition to the zero line, the plotted points of the curve being in vertical relation with the intersecting points of the squares, the base-piece having numerals adjacent the curves to determine the final result and with which one slide cooperates after being initially positioned on the squares to determine by means of the pointer and the reference numerals where it is to be positioned with relation to the curves to give the final reading, said final reading being determined when a correction line intersects the desired curve and the zero line is used with relation to the numerals adjacent the curves.

5. A computing device for the purpose described, comprising in combination, a base-piece, a triangular shaped member thereon having intersecting lines drawn parallel with and at right angles to the hypothenuse for dividing the surface of the same into squares, said squares having reference numerals placed on their sides to represent width and length dimensions, and the base piece having spaced numerals to represent the distances of the intersecting points or rows of squares, the base side of the triangle being the zero position from which the squares are designated by the spaced numerals, curves to represent different depths and spaced numerals adjacent the curves which serve to give the final result, the plotted points of which are located in the same vertical lines as the intersecting points of the squares, two slides movable with reference to the squares and curves, the one slide having lines thereon which cooperate with the squares and curves, and carried by the second slide and the lines of which serve to determine the position of the second slide when placed with reference to the squares and the curves, whereby the position of the first slide with reference to the curves and spaced numerals will give the final result, and said first slide having lines thereon which cooperate with the curves for correctly locating its position with reference to the depth curves, as described.

6. A computing device for the purpose described, the combination, of a base-piece, a plurality of squares thereon formed by intersecting lines so arranged that their diagonal distances are in the same vertical lines, a reference scale indicating the number of rows or diagonal distances of the squares, two slides, one cooperating with the intersecting points of the squares for the purpose of determining the position of the other slide with reference to the scale, curves on the base-piece, the plotted points of which are in the same vertical lines as the diagonal lines of said squares, a scale adjacent the curves for determining the final result, one slide having a zero and correction lines thereon and which lines are selected for use from the reference scale and placed so as to intersect the desired curve to determine the final result with reference to the scale of figures adjacent the curves.

7. In a computing instrument, the combination, a base-piece, a member thereon having its surface divided into squares formed by intersecting lines and one edge of the member being considered the zero line, the intersecting points of the squares being in vertical lines, a scale of reference numerals indicating the number of rows of squares, curves, the plotted points of which are in the same vertical lines as the diagonals of the squares, slides cooperating with said lines, the intersecting points and the said reference numerals, one slide having a zero and correction lines thereon which cooperate with the intersecting points of the squares and the curves and with the vertical lines, and numerals comprising a scale adjacent the curves cooperating with the slide when the lines intersect the curves for determining the final result.

JOHN G. CLARK.

Witness:
CHARLES E. ALDERMAN.